(12) United States Patent
Markert et al.

(10) Patent No.: US 6,712,686 B2
(45) Date of Patent: Mar. 30, 2004

(54) POULTRY THIGH PROCESSOR

(75) Inventors: Georg H. Markert, Otterlo (NL); Cornelis Hendrikus Van De Vecht, Houten (NL); Egbertus Martinus Joosten, Hoorn (NL)

(73) Assignee: Equimex Holding B.V., Otterlo (NL)

( * ) Notice: Subject to any disclaimer, the term of this patent is extended or adjusted under 35 U.S.C. 154(b) by 0 days.

(21) Appl. No.: 10/170,924

(22) Filed: Jun. 13, 2002

(65) Prior Publication Data
US 2003/0114097 A1 Jun. 19, 2003

Related U.S. Application Data
(60) Provisional application No. 60/342,152, filed on Dec. 19, 2001.

(51) Int. Cl.[7] .............................................. A22C 21/00
(52) U.S. Cl. ..................................................... 452/160
(58) Field of Search ................... 452/134, 135, 452/155, 160, 177

(56) References Cited

U.S. PATENT DOCUMENTS

| | | | |
|---|---|---|---|
| 1,980,904 A | 11/1934 | Botz | |
| 2,243,951 A | 6/1941 | Gehlke | |
| 2,255,796 A | 9/1941 | Linane et al. | |
| 2,922,718 A | 1/1960 | Saverslak | |
| 3,644,125 A | 2/1972 | Lobiondo et al. | |
| 3,731,344 A | 5/1973 | Phares et al. | |
| 4,027,044 A | 5/1977 | Taylor | |
| 4,639,972 A | * 2/1987 | Martin et al. | 452/136 |
| 4,985,965 A | 1/1991 | Leavitt | |
| 4,993,113 A | * 2/1991 | Hazenbroek | 452/136 |
| 4,993,114 A | * 2/1991 | Meyer et al. | 452/136 |
| 5,019,013 A | 5/1991 | Hazenbroek | |
| 5,090,940 A | * 2/1992 | Adkison | 452/136 |
| 5,250,309 A | 10/1993 | Gagliardi, Jr. | |
| 5,266,064 A | * 11/1993 | Gagliardi, Jr. | 452/135 |
| 5,273,483 A | 12/1993 | Gagliardi, Jr. | |
| 5,284,669 A | 2/1994 | Gagliardi, Jr. | |
| 5,782,685 A | * 7/1998 | Hazenbroek et al. | 452/138 |
| 6,027,404 A | * 2/2000 | Wols | 452/138 |
| 6,475,076 B1 | * 11/2002 | Rheingans et al. | 452/167 |

FOREIGN PATENT DOCUMENTS

| | | |
|---|---|---|
| GB | 2 566 629 | 1/1986 |
| JP | 8302495 | 2/1985 |

* cited by examiner

*Primary Examiner*—Thomas Price
(74) *Attorney, Agent, or Firm*—Gardner Groff, P.C.

(57) ABSTRACT

A conveyor with a channel for receiving a bone and surrounding meat of poultry parts and advancing them into engagement with a blade assembly. The blade assembly has a notch that separates the poultry parts into spare rib-type products and boneless meat patties. The blade assembly may have two ramps for lifting sides of the poultry part to permit cutting the meat above the bone and below the side portions. Additionally, a method is disclosed for separating the poultry parts into the spare rib-type products and the boneless meat patties.

29 Claims, 10 Drawing Sheets

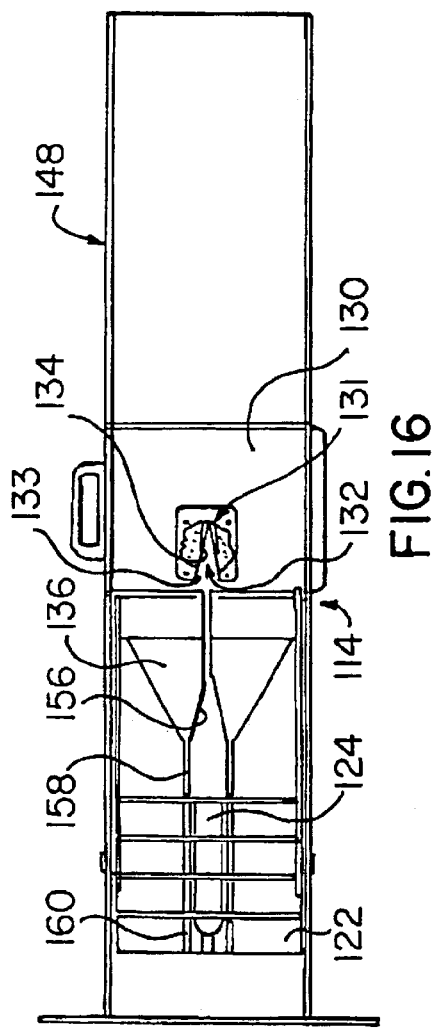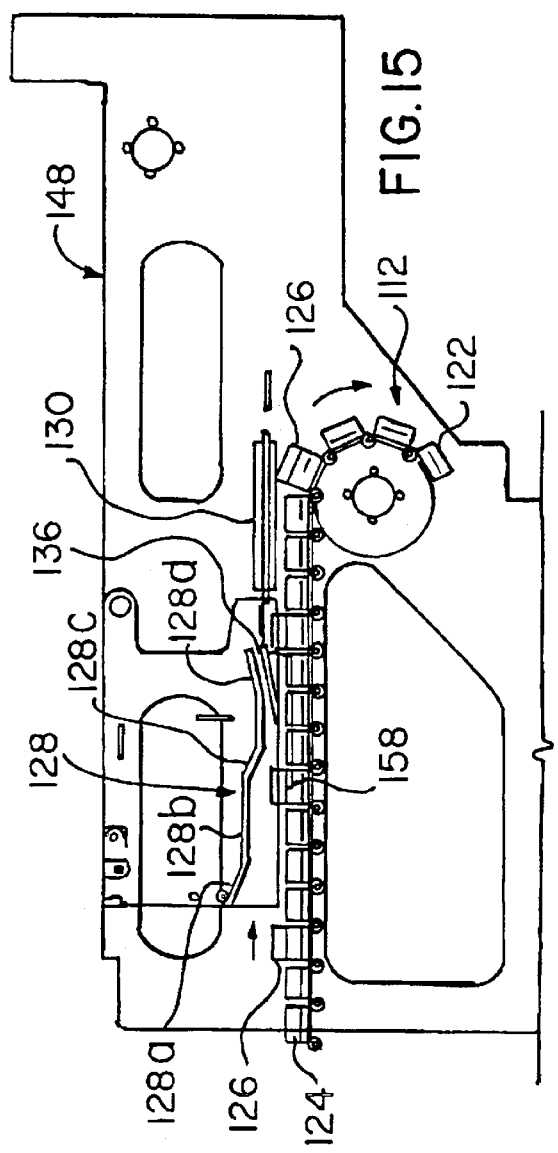

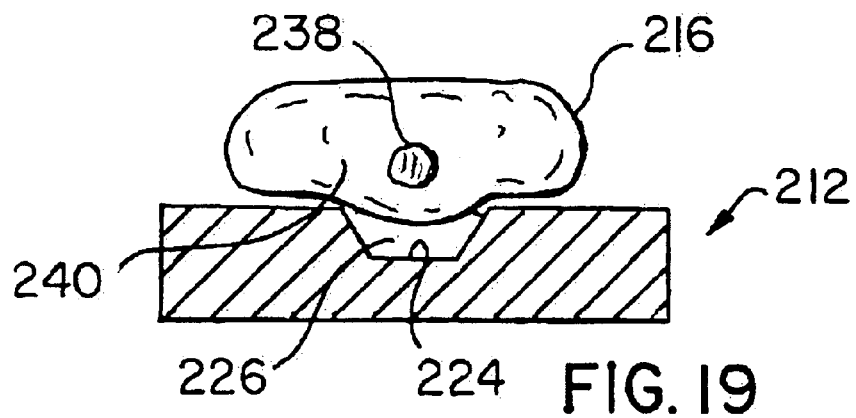
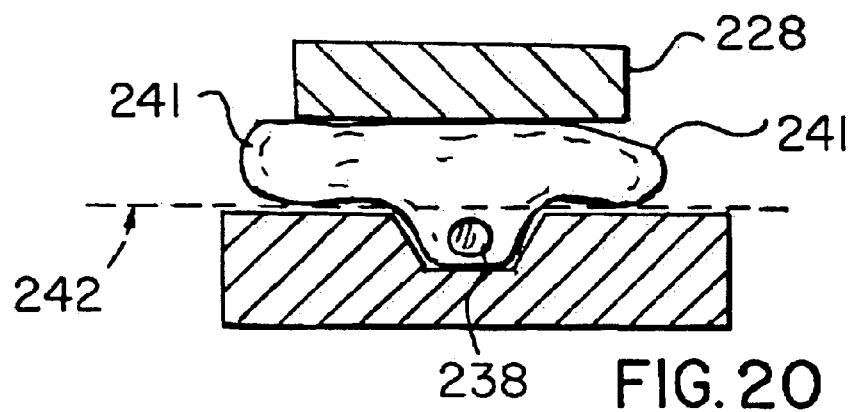
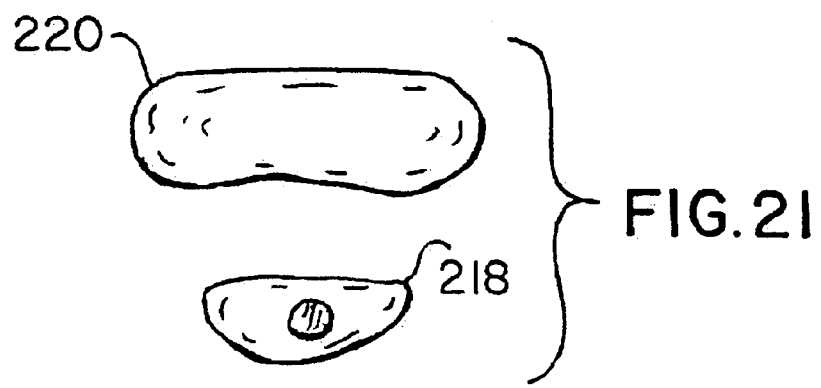

POULTRY THIGH PROCESSOR

CROSS-REFERENCE TO RELATED APPLICATIONS

This application claims the priority benefit of U.S. Provisional Patent Application Serial No. 60/342,152 filed Dec. 19, 2001, which is hereby incorporated herein by reference in its entirety.

TECHNICAL FIELD

The present invention relates generally to poultry processing and, more particularly, to a machine and method for processing poultry thigh parts into separate thigh-bone "spare ribs" and boneless patties.

BACKGROUND OF THE INVENTION

Poultry is conventionally processed and sold as whole birds or in parts such breasts, thighs, legs, wings, or a combination of these parts. Such processing is typically done by hand or by machines with conveyors and cutting mechanisms for separating the poultry into the desired parts for sale to consumers. These machines can significantly increase the efficiency of the poultry processing, thereby benefiting the consumers by allowing lower pricing of the poultry parts.

In recent times consumers have increasingly preferred poultry and other relatively low fat "white meat" products for their perceived health benefits over higher-fat red meats. For example, beef and even pork spare ribs have traditionally been very popular with consumers, but they generally have a higher fat and caloric content than chicken parts. In response to this consumer preference, poultry processors have introduced new products such as chicken fingers, nuggets, and patties, as well as ground chicken and turkey, which have all gained widespread popularity. However, most known poultry processing machines are limited to producing the mentioned poultry products.

Accordingly, it can be seen that a need remains for a poultry-processing machine for producing innovative meat products to meet the consumer preference for a more healthy diet. In particular, it would be advantageous for such a machine to process poultry into the form of traditionally accepted red meat products. Furthermore, a need exists for such a machine that can be operated to efficiently produce healthy meat products that can be sold at an economical price to consumers. It is to the provision of a machine meeting these and other needs that the present invention is primarily directed.

SUMMARY OF THE INVENTION

The present invention provides machines and methods for processing poultry thighs into innovative meat products to meet the consumer preference for a more healthy diet. The invention can be used to efficiently separate, by a single cut, poultry thighs into two pieces. One piece is a sparerib-type meat product shaped similarly to traditional beef or pork spareribs. The other piece is a boneless meat patty shaped similarly to traditional boneless poultry breasts. These two pieces can then be cooked by grilling, barbecuing, baking, roasting, or otherwise preparing for eating, or they can be further processed for other uses. Of course, the disclosed invention can be used to process any animal part having a bone and meat surrounding the bone, as may be desired.

Generally described, the machines of the present invention include a blade assembly for making a single cut above the bone and below the side portions to separate a first portion of the thigh meat from the bone (resulting in the boneless thigh-meat patty) while leaving a second portion of the meat surrounding the bone (resulting in the chicken sparerib). The machines also include a conveyor that moves the poultry thighs into engagement with the blade assembly, and a frame supporting the blade assembly and the conveyor.

The blade assembly may have a notch in it with a cutting surface. The notch can be generally V-shaped, though other shapes of notches can be used. Also, the conveyor may have a channel in it for receiving at least some of the bone and the surrounding meat. Additionally, the conveyor may have dog members for pushing the thighs toward the blade assembly, with the dog members sized and shaped to pass below the cutting surface of the blade assembly. Furthermore, the machines can have a presser foot positioned above the cutting surface for securing the thighs in place when they are cut by the blade assembly.

In a first exemplary embodiment, the channel is sized and shaped to receive only some of the bone, and the cutting surface is spaced above the conveyor. Between the conveyor and the cutting surface are two (or another number of) ramps positioned at the sides of the channel and in front of the cutting surface. The ramps lift side portions of the thigh meat as it is conveyed across the ramps, before the thigh meets the cutting surface. In this way, the cutting surface can make the single cut above the bone but below the lifted thigh side portions.

In a second exemplary embodiment, the ramps have opposing splayed edges so that, as the ramps lift the thigh side portions, the splayed edges pinch the meat above the bone. The cutting surface can then cut the thigh adjacent the pinch to produce a more cylindrical-shaped sparerib. Also, the ramps may have guides that slide in grooves in the conveyor to direct the thighs toward the cutting surface regardless of the adjustable height of the blade assembly.

In a third exemplary embodiment, the channel is sized and shaped to receive substantially all of the bone, but not the thigh side portions, and the cutting surface is disposed immediately above the conveyor. In this way, the ramps are not needed because the sides of the thigh are raised above (or otherwise separated from) the bone by not being received in the channel. Also, the blade assembly may have a wedge-shaped leading edge for wedging under the thigh sides so that the cutting surface can make the cut above the bone and below the side portions.

In a fourth exemplary embodiment, the blade assembly has a semi-tubular body with the cutting surface formed on it. In this way, the channel and the semi-tubular blade body together form a tube that the bone and some of the surrounding meat (i.e., the chicken sparerib) can fit through, and the cutting surface is positioned to cut away the remainder of the thigh meat from the sparerib. Accordingly, the ramps are not needed.

The present invention may also provide methods of processing poultry. Generally described, the methods include providing a blade assembly and a conveyor, positioning the animal parts on the conveyor, conveying the animal parts into the blade assembly, and cutting the animal parts above the bone and below the side portions to separate the thighs into the boneless meat patties and the chicken spareribs.

The conveyor may be provided with a channel in it for receiving at least some of the thighbone, and the method may include pressing at least some of the bone and at least some of the surrounding thigh meat into the channel.

Additionally, the method may include lifting the sides of the chicken thighs before they are cut by the blade assembly. Furthermore, the method may include pinching the thigh meat above the bone before the chicken thigh is cut by the blade assembly.

These and other objects, features, and advantages of the present invention will become more apparent upon reading the following description in conjunction with the accompanying drawing figures.

BRIEF DESCRIPTION OF THE DRAWING FIGURES

FIG. 15 is a side elevation view of the processor of FIG. 9, showing a portion of the frame housing the conveyor and a blade assembly.

FIG. 16 is a cross sectional plan view of the processor of FIG. 15 with some of the conveyor carriers removed for clarity.

FIG. 19 is a front cross sectional view taken at line 19—19 of FIG. 18, showing one of the poultry parts on the conveyor.

FIG. 20 is a front cross sectional view taken at line 20—20 of FIG. 17, showing the poultry part being pressed down into the conveyor channel and cut in two above the bone by the blade assembly.

FIG. 21 is a front view of the poultry part of FIG. 20 after it is cut into a spare rib-type product and a boneless patty.

DETAILED DESCRIPTION OF THE PREFERRED EMBODIMENTS

Figure 1:
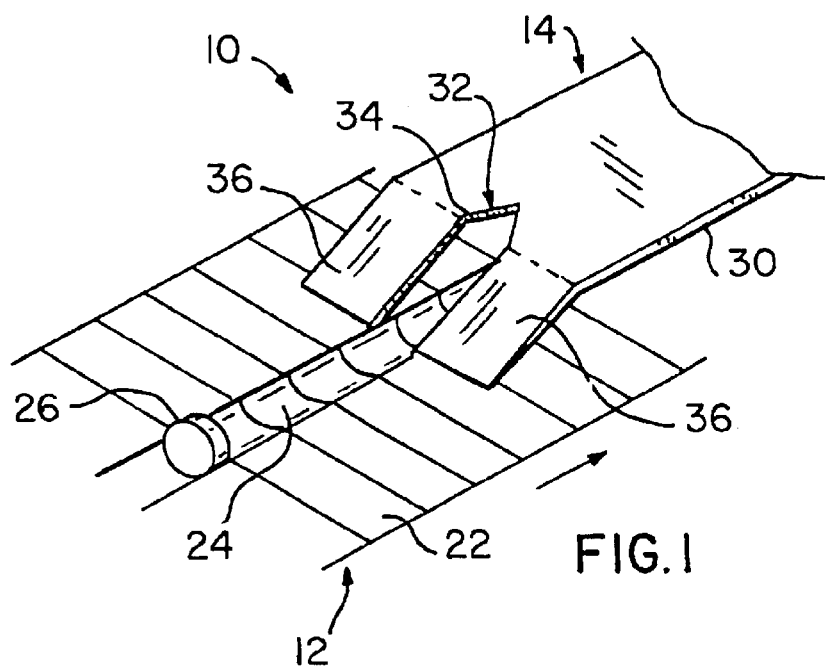
FIG. 1 is a perspective view of a portion of a poultry part processor according to a first exemplary embodiment of the present invention, showing a conveyor and a blade assembly.

Referring now to the drawing figures, wherein like reference numerals represent like parts throughout the several views, the present invention provides for processing animal parts into spare rib-type meat products (e.g., "chicken spare ribs") and boneless meat patties. The invention may be used with animal parts having a longitudinal bone and meat surrounding the bone. For example, the invention may be used with thigh parts of poultry parts such as chicken, turkey, duck, goose, pheasant, or quail. It will be understood, then, that although the invention is described herein as used with chicken thighs, the machine may be suitably used with other parts of other animals.

Figure 2:
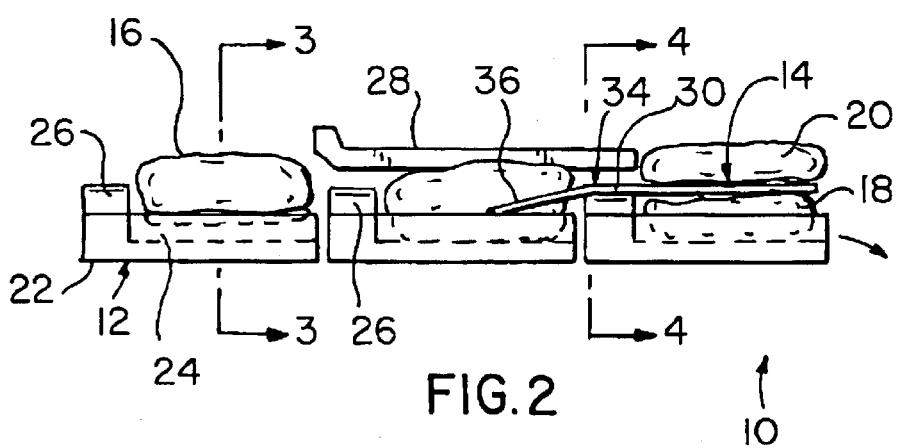
FIG. 2 is a side view of the processor portion of FIG. 1, showing poultry parts being transported by the conveyor into engagement with the blade assembly.

Referring to FIGS. 1 and 2, a first exemplary embodiment of the present invention comprises a machine 10 having a conveyor 12 and a blade assembly 14. The conveyor 12 supports the chicken thighs 16 and moves to advance them toward the blade assembly 14. When the chicken thighs 16 reach the blade assembly 14, it separates them in a single cut into the chicken spare ribs 18 and the boneless meat patties 20.

In order to provide for sanitary and hygienic processing, some or all of the components of the conveyor 12 and the blade assembly 14 may be made of stainless steel or other non-corrosive materials. In order to produce the components cost-efficiently, they can be made by conventional fabrication techniques.

The conveyor 12 may have a number of carriers 22 connected together or to a chain, belt, or other support structure. The conveyor 12 includes a conventional drive mechanism having rollers, axles, and actuators for advancing the carriers 22 around in a closed loop. For example, in a typical commercial embodiment the drive mechanism can be configured for three phase, 380 volt operation, with the actuator provided by a 1.1 hp motor. When the drive mechanism is operated, the conveyor 12 advances the chicken thighs 16 toward and into engagement with the blade assembly 14 for cutting. For example, the conveyor 12 may be configured so that the machine processes up to about 2,200 chicken thighs per hour. Of course, other conveyors that are known in the art can be suitably employed.

Also, the conveyor 12 may have a channel 24 in the carriers 22 above which the chicken thigh 16 is placed. By placing the chicken thigh 16 on the conveyor 12 bone downward with the bone aligned above and parallel to the channel 24, the bone and some of the meat surrounding the bone tend to droop into the channel 24. To receive the bone and meat with a nice fit, the channel 24 may have a generally semi-circular shape. Alternatively, the channel 24 may have another regular or irregular shape.

Additionally, the conveyor 12 may have dog members 26 in and/or above the channel 24 for pushing the chicken thighs 16 along despite the cutting forces of the blade assembly 14 that might otherwise tend to urge the chicken thighs backward. The number of dog members 26 is selected based on the size of the conveyor 12 and the chicken thighs 16. The size and shape of the dog members 26 are selected to permit them to pass between the ramps (described below) and through the notch (described below) of the blade assembly 14. For example, the dog members 26 may have the shape of a hoop, block, finger, or wedge, or they may have another regular or irregular shape.

The machine 10 may also have a presser foot 28 positioned above the conveyor 12 and the blade assembly 14. The presser foot 28 secures the chicken thighs 16 in position, with some of the bone and meat held in the channel 24, as they are cut by the blade assembly 14. The presser foot 28 may progressively press down on the top of the chicken thigh 16 as it is carried along by the conveyor 12. For example, the presser foot 28 may be provided by a bar, slat, rod, or other structure that is angled gradually or in stages (see FIG. 15), and/or it may have an actuator operably coupled to it for moving it horizontally, pivotally, or otherwise. Furthermore, such an actuator may be controlled to move the presser foot 28 down to compress the chicken thigh 16 before cutting and back up immediately afterward so that it is ready for the next thigh.

Turning now to the blade assembly 14, it may have a body 30 with at least one notch 32 that forms a cutting surface 34 for separating the chicken thighs 16 into the spare ribs 18 and the patties 20. The blade body 30 may be provided by a single piece of material, or two or more pieces may be positioned beside each other to form the body and/or to define the notch 32. The notch 32 may be generally V-shaped, or it may be arcuate, serrated, or have another regular or irregular shape. Also, the notch 32 (and cutting surface 32) may be formed directly in the body 30, or a separate blade member may be coupled to the body (see FIG. 16) and have the notch (and cutting surface) defined in it.

Instead of just the one notch 32 shown, a number of the notches 32 may be provided in a parallel arrangement in the same or separate blade assemblies 14. Also, the conveyor 12 may have a number of parallel channels 24, with each one of the notches 32 positioned over one of the channels. In this configuration, the machine 10 can be used to process multiple chicken thighs 16 simultaneously in a side-by-side arrangement.

The blade assembly 14 may be fixed in place, so that it does not need to be moved back-and-forth to cut the meat. In this way, the chicken thighs 16 are processed in a more consistent fashion than by hand cutting. Also, the blade assembly 14 may be adjustably mounted above the conveyor 12 so that the cutting surface 34 can be raised or lowered relative to the conveyor. For example, the blade assembly 14 may be mounted to the machine using a worm gear, a rack-and-pinion gear, another gear arrangement, hydraulic or pneumatic systems, a combination of these, or other structures known in the art, with a handle for manual operation and/or an actuator for remote control. In this way, the machine 10 can be used with different parts of different animals, with larger or smaller animal parts, or to leave more or less meat on the bones.

In the present embodiment, the channel 24 is configured to receive only some of the bone and the cutting surface 34 is spaced above the conveyor 12 enough that the portion of the bone not in the channel (and some of the surrounding thigh meat) can pass below the cutting surface. In order to progressively lift the side portions of the meat before the chicken thigh 16 engages the cutting surface 34, the blade assembly 14 includes two (or more) downwardly extending ramps 36. The ramps 36 are positioned at the sides of the channel 24 and in front of the cutting surface 34 so that the bone (and some of the meat on it) and the dog member 26 can pass between them. The ramps 36 may be provided integrally with and extending from the body 30 or as separate structures coupled to or spaced from the body, whichever is desired.

Figure 3:
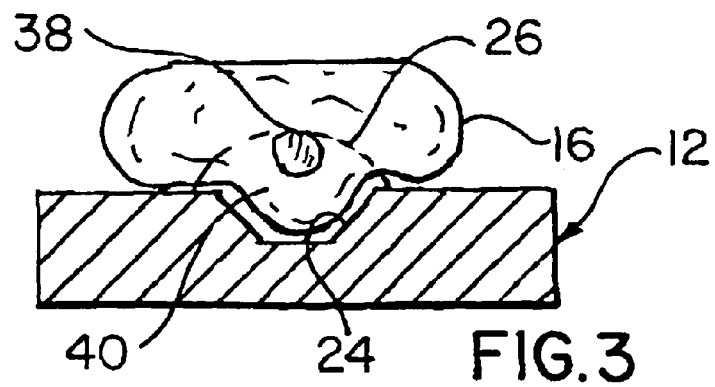
FIG. 3 is a front cross sectional view taken at line 3—3 of FIG. 2, showing one of the poultry parts on the conveyor.
Figure 4:
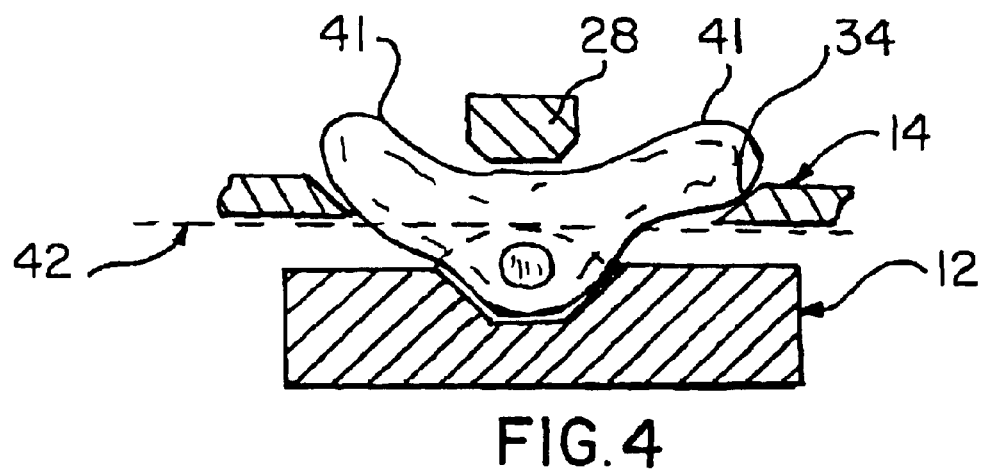
FIG. 4 is a front cross sectional view taken at line 4—4 of FIG. 2, showing the sides of the poultry part being lifted by ramps and the poultry part being cut in two above the bone by the blade assembly.
Figure 5:
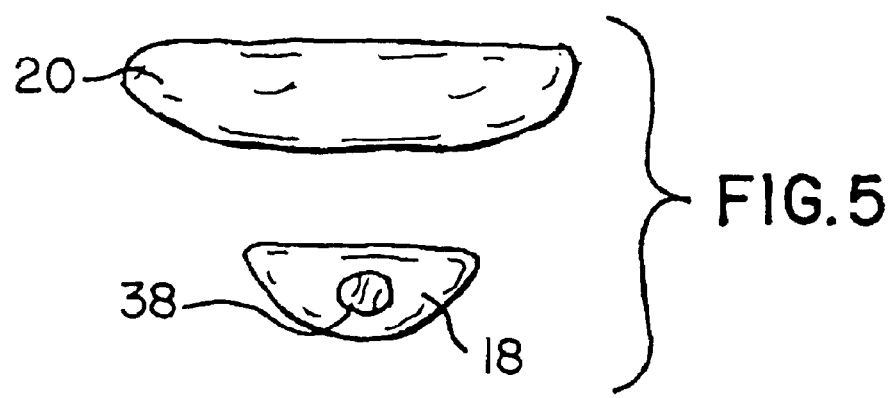
FIG. 5 is a front view of the poultry part of FIG. 4 after it is cut into a spare rib-type product and a boneless patty.

Referring now to FIGS. 3–5, the operation of the machine 10 will be described. As shown in FIG. 3, the chicken thighs 16 are placed on the conveyor 12 with the bone 38 and some of the surrounding thigh meat 40 tending to droop down into the channel 24. The conveyor 12 is operated to transport the chicken thighs 16 toward the presser foot 28 and the blade assembly 14. As the conveyor 12 moves, attendants continuously add new chicken thighs 16 onto the conveyor in an on-going process.

As shown in FIG. 4, the chicken thighs 16 are conveyed into engagement with the presser foot 28, which urges the bone 38 and some of the surrounding thigh meat 40 downward into the channel 24. The conveyor 12 then transports the chicken thighs 16 into engagement with the blade assembly 14. As the chicken thighs 16 are conveyed across the ramps 36 of the blade assembly 14, the side portions 40 of the thighs are lifted up off the conveyor 12. Then the cutting surface 34 of the blade assembly 14 cuts the chicken thigh 16 above the bone 38 and below the side portions 40.

In this way, the channel 24, the presser foot 28, the ramp 36, and the cutting surface 34 cooperate to cut the chicken thigh 16 along a single cut line 42 into two pieces. As a result, the chicken thigh 16 is separated into a first portion, the boneless thigh meat patty 20, and a second portion, the chicken spare rib 18, as shown in FIG. 5.

Because the spare rib 18 passes under the cutting surface 34, it is still on the conveyor 12. The spare rib 18 then falls off the end of the conveyor 12 and into or onto a separate bin, conveyor, or other receiving structure. The patty 20 is pushed by the subsequent patty across the body 30 and falls into or onto a separate bin, conveyor, or other receiving structure. Of course, other structures and arrangements may be provided for transporting the processed the spare ribs 18 and patties 20 out of the machine. The spare ribs 18 and patties 20 may then be packaged for delivery to grocers, restaurants, food processors, and/or others.

Figure 6:
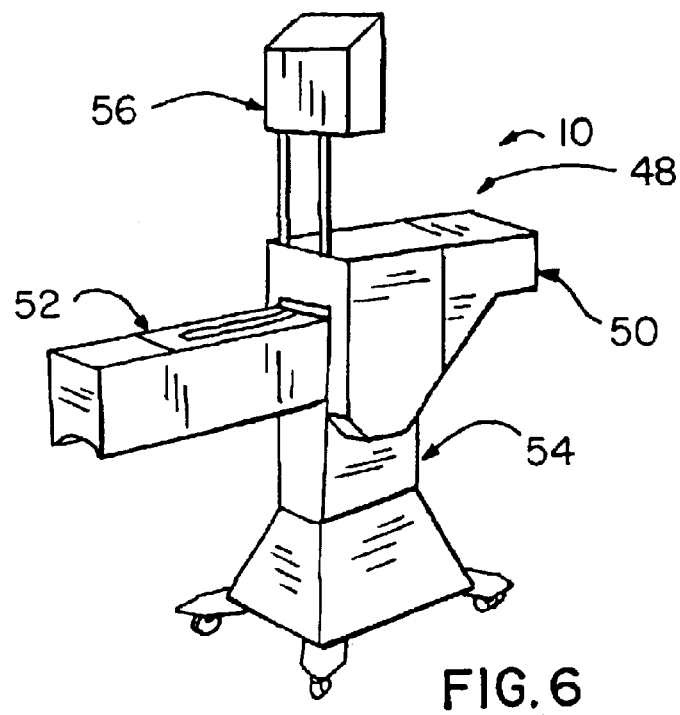
FIG. 6 is a perspective view of the processor of FIG. 1, showing a frame housing the conveyor and the blade assembly.
Figure 7:
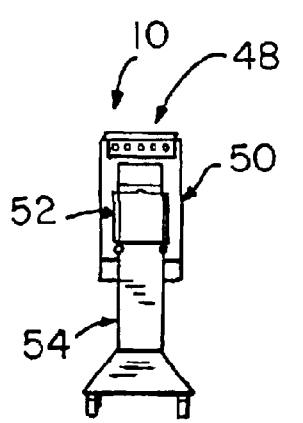
FIG. 7 is a front elevation view of the processor of FIG. 6.
Figure 8:
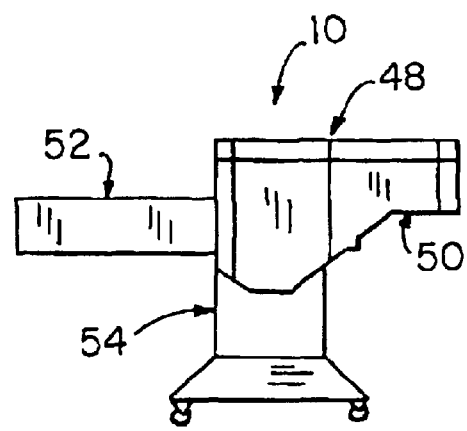
FIG. 8 is a side elevation view of the processor of FIG. 6.

Referring now to FIGS. 6–8, the machine 10 may include a frame 48 with a cutting section 50 housing the blade assembly 14 and the presser foot 28, a feed section 52 including the conveyor 12 for advancing the chicken thighs into the cutting section, and a base section 54 supporting the feed section and the cutting section. In this arrangement, the machine 10 is a compact, freestanding, and portable apparatus. In a typical commercial embodiment, the machine frame could be about 1800 mm long, about 630 mm wide, and about 1100 mm high, with a weight of about 140 kg. Alternatively, the machine components may be arranged in an assembly line configuration supported by separate structures.

Also, a controls section 56 may be provided for housing conventional controls for operating the conveyor 12 and/or other components of the machine. For example, the controls can provide for turning the machine on and off, adjusting the speed of the conveyor, and adjusting the height of the cutting surfaces above the conveyor. Of course, other controls can be suitably employed, as may be desired.

In a second exemplary embodiment shown in FIGS. 9–16, the machine 110 includes a conveyor 112, blade assembly 114, presser foot 128, and frame 148 that are similar to those of the first embodiment. Accordingly, the conveyor 112 has a channel 124 and dog members 126, and the blade assembly 114 has ramps 136 and a notch 132 forming a cutting surface 134.

Figure 9:
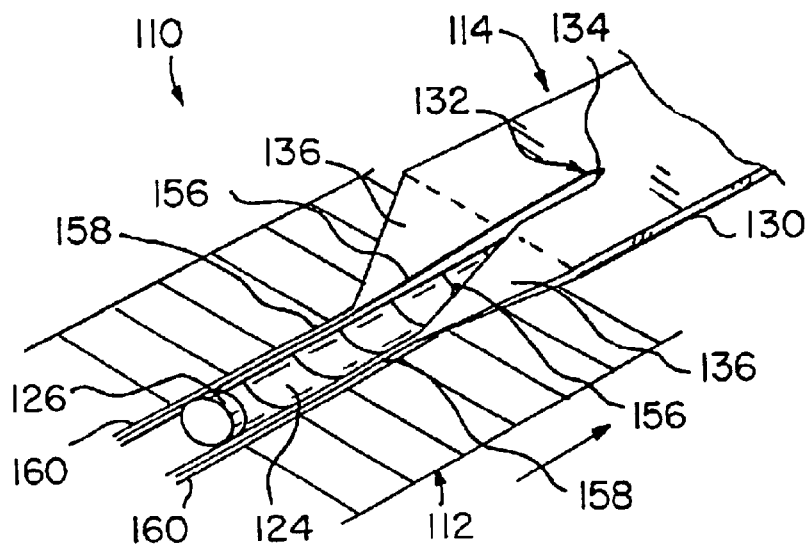
FIG. 9 is a perspective view of a portion of a poultry part processor according to a second exemplary embodiment, showing a conveyor and a blade assembly.
Figure 10:
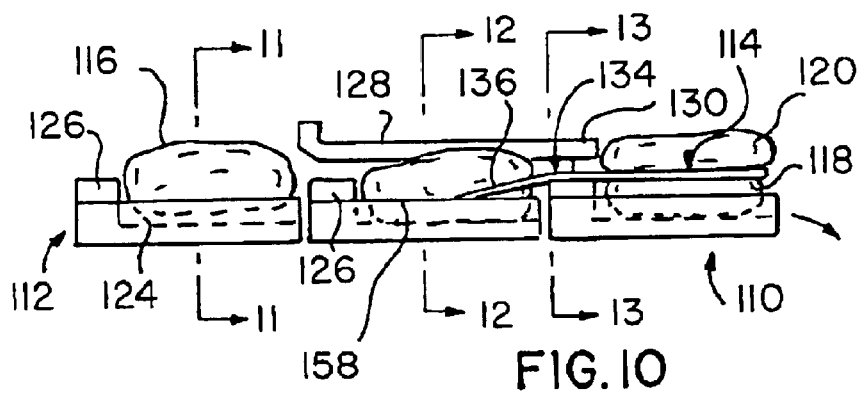
FIG. 10 is a side view of the processor portion of FIG. 9, showing poultry parts being transported by the conveyor into engagement with the blade assembly.

However, as best shown in FIGS. 9 and 10, the ramps 136 of the blade assembly 114 have opposing splayed edges 156 that are spaced closer together at the ramp tops than at the ramp bottoms. In this arrangement, as the ramps 136 lift the side portions of the chicken thigh 16, the splayed edges 156 form a progressively narrower constriction that pinches the thigh meat above the bone prior to cutting.

In addition, the ramps 156 may have guides 158 that extend downward from them. To receive the guides 158, the conveyor 112 may have grooves 160 generally parallel to the channel 124. The guides 158 may extend in front of and/or behind the ramps 136 and have a shape, thickness, and depth selected to provide the smoothest operation. For example, the guides 158 may extend in front the ramps 136 and have a sloped top to urge the chicken thigh sides onto the ramps 136 when the blade assembly 114 is adjusted upward (with the ramp bottoms above the conveyor) for processing larger animal parts.

Figure 11:
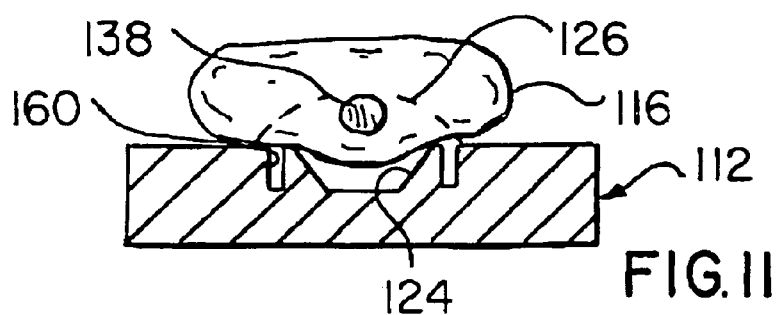
FIG. 11 is a front cross sectional view taken at line 11—11 of FIG. 10, showing one of the poultry parts on the conveyor.

Referring now to FIGS. 11–14, the operation of the machine 110 will be described. As shown in FIG. 11, the chicken thighs 116 are placed on the conveyor 112 with the bone 138 and some of the surrounding thigh meat 140 tending to droop down into the channel 124. The conveyor 112 transports the chicken thighs 116 toward the presser foot 128 and the blade assembly 114.

Figure 12:
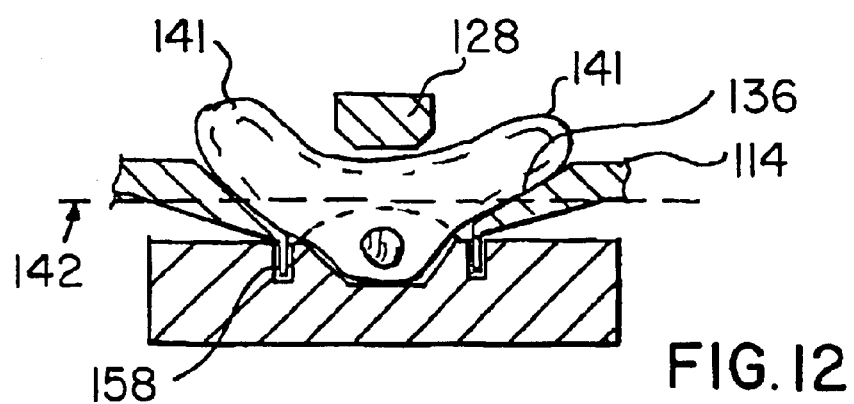
FIG. 12 is a front cross sectional view taken at line 12—12 of FIG. 10, showing the sides the poultry part being lifted by ramps.
Figure 13:
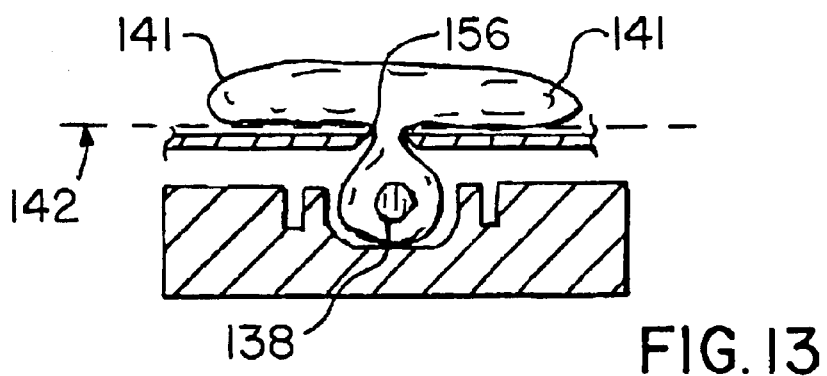
FIG. 13 is a front cross sectional view taken at line 13—13 of FIG. 10, showing the poultry part being pinched above the bone by the ramps and the poultry part being cut in two above the bone by the blade assembly.

As shown in FIGS. 12 and 13, the chicken thighs 116 are conveyed into engagement with the presser foot 128, which urges the bone 138 and some of the surrounding thigh meat 140 downward into the channel 124. The conveyor 112 then transports the chicken thighs 116 into engagement with the blade assembly 114. As the chicken thighs 116 are conveyed across the ramps 136 of the blade assembly 114, the ramps 136 lift the thigh side portions 141 up off the conveyor 112 and the splayed edges 156 pinch the thigh meat above the bone 138. Then the cutting surface 134 of the blade assembly 114 cuts the chicken thigh 116 above the bone 138 and below the side portions 141.

Figure 14:
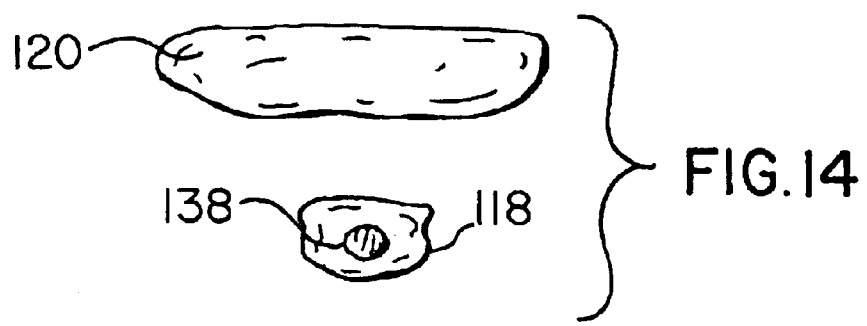
FIG. 14 is a front view of the poultry part of FIG. 13 after it is cut into a spare rib-type product and a boneless patty.

In this way, the channel 124, the presser foot 128, the ramp 136 with splayed edges 156, and the cutting surface 134 cooperate to cut the chicken thigh 116 along a single cut line 142 into two pieces. As a result, the chicken thigh 116 is separated into the boneless thigh meat patty 120 and the chicken spare rib 118, as shown in FIG. 14. But the spare rib 118 has a more cylindrical shape than that produced by the first embodiment.

Referring now to FIGS. 15 and 16, the machine 110 is shown with a frame 148 similar to that of the first embodiment. In this figure, the mounting of the components of the conveyor 112, the blade assembly 114, and the presser foot 128 to the frame 148 are shown in more detail.

In particular, the presser foot 128 may have a staged arrangement including a first segment 128a, a second segment 128b, a third segment 128c, and a fourth segment 128d. The first segment 128a may be angled relative to the conveyor carriers 122 to form an opening stage for receiving the chicken thighs 116. The second segment 128b may be generally parallel to the conveyor carriers 122 to form a compression stage to urge the bone 138 and some surrounding meat 140 into the channel 124. The third segment 128c may be angled relative to the conveyor carriers 122 to form a throttling stage to urge the bone 138 and some surrounding meat 140 into the channel 124 in spite of the increasing upward forces from the side portions 141 being pulled upward by the ramps 156. And the fourth segment 128d may be angled relative to the conveyor carriers 122 but generally parallel to the ramps 156 to form a final stage with all of the bone 138 and some of the surrounding meat 140 below the ramps 156 and with the thigh side portions 141 between the ramps and the presser foot 128d. The chicken thigh 116 is now ready to be cut by the cutting surface 134. Of course, the presser foot 128 may be configured in other arrangements to provide similar or different results.

Additionally, the blade assembly may be provided in a number of different arrangements. As mentioned above, one arrangement has the notched cutting surface formed directly in the body. As shown in FIGS. 15 and 16, another arrangement of the blade assembly 114 has at least one separate blade member 131 defining the notch 132 and cutting surface 134. The blade member 131 may be removably coupled to the blade body 130 so that the blade members can be replaced as they are worn and dulled. For example, the blade members 131 can be provided by conventional blades used for razors, utility knives, and/or the like. Also, if the blade member 131 is spaced back from the front of the body 130 (and/or the backs of the ramps) as shown, then a slot 133 is provided in the body and in alignment with the gap between the ramps 136.

In a third exemplary embodiment shown in FIGS. 17–21, the machine 210 includes a conveyor 212, blade assembly 214, presser foot 228, and frame 248 that are similar to those of the first embodiment. Accordingly, the conveyor 212 has a channel 224 and the blade assembly 214 has a notch 132 forming a cutting surface 134.

Figure 17:
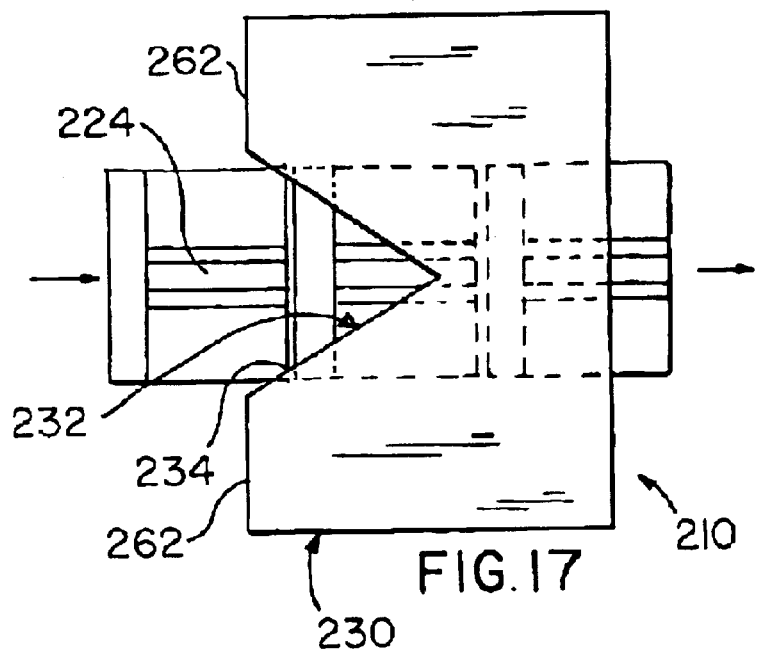
FIG. 17 is a plan view of a portion of a poultry part processor according to a third exemplary embodiment, showing a conveyor and a blade assembly.
Figure 18:
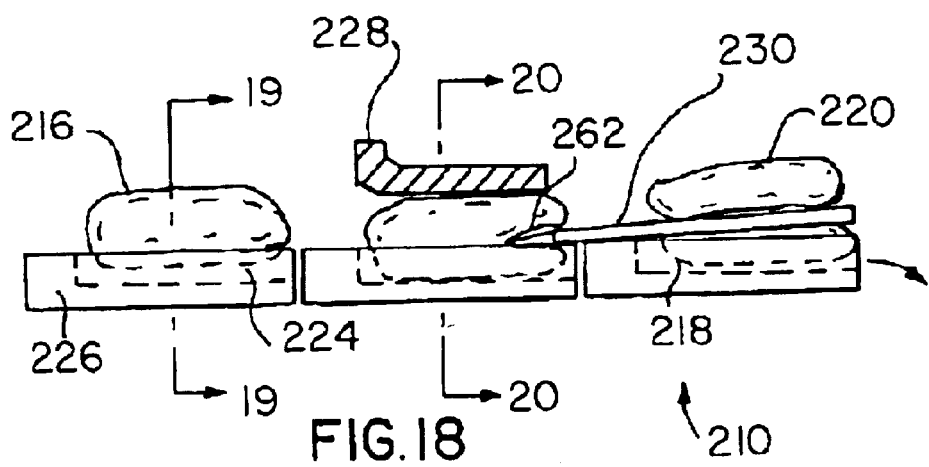
FIG. 18 is a side view of the processor portion of FIG. 17, showing poultry parts being transported by the conveyor into engagement with the blade assembly.

However, as best shown in FIGS. 17 and 18, in this embodiment the blade assembly 214 does not need ramps. Instead, the channel 224 is deep and wide enough to receive substantially all of the bone, but not the side meat portions. Thus, when the presser foot 128 forces the bone into the channel 224, the side meat portions of the chicken thigh 216 can not fit into the channel and so they remain up on the conveyor 212. The cutting surface 234 is positioned just above the conveyor 212 so that the cutting surface cuts the chicken thigh 216 above the bone and below the thigh sides.

In order to wedge the cutting surface 234 between the conveyor 212 and the chicken thigh 216, the body 230 of the blade assembly 214 may have a wedged leading edge 262. As best shown in FIG. 21, the wedged leading edge 262 of the blade assembly 214 is positioned at the sides of the notch 232 and the channel 234 so that it slips under the thigh sides 241. In this way, the lifting and pinching effect produced by the ramp and its splayed edges of the second embodiment is accomplished by the channel 224 and the leading edge 262.

Because the cutting surface 234 is positioned just above and very close to the conveyor 212, the dog members 226 are positioned entirely (or almost entirely) within the channel 224. If the dog members 226 extend above the conveyor 212, they do so only slightly so that they are still below the cutting surface 234. Alternatively, because more of the surface area of the chicken thighs 216 is forced into the channel 224, the resulting frictional forces tend to hold them in place so that the conveyor 212 may not need the dog members 226.

Referring now to FIGS. 19–21, the operation of the machine 210 will be described. As shown in FIG. 19, the chicken thighs 216 are placed on the conveyor 212 with the bone 238 and some of the surrounding thigh meat 240 tending to droop down into the channel 224. The conveyor 212 transports the chicken thighs 216 toward the presser foot 228 and the blade assembly 214.

As shown in FIG. 20, the chicken thighs 216 are conveyed into engagement with the presser foot 228, which urges substantially all of the bone 238 and some of the surrounding thigh meat 240 downward into the channel 224. However, the sides 241 of the chicken thigh 216 do not fit into the channel 212 and remain up on the conveyor 212. The conveyor 212 then transports the chicken thighs 216 into engagement with the blade assembly 214. Because the cutting surface 234 is just above the conveyor 212 and leading edge 262 of the blade assembly 214 is wedge-shaped, the cutting surface slips under the side portions 241 and cuts the chicken thigh above the bone 238 and below the side portions.

In this way, the channel 224, the presser foot 228, and the cutting surface 134 with its wedged leading edge 262 cooperate to cut the chicken thigh 216 along a single cut line 242 into two pieces. As a result, the chicken thigh 216 is separated into the boneless thigh meat patty 220 and the chicken spare rib 218, as shown in FIG. 21.

Figure 22:
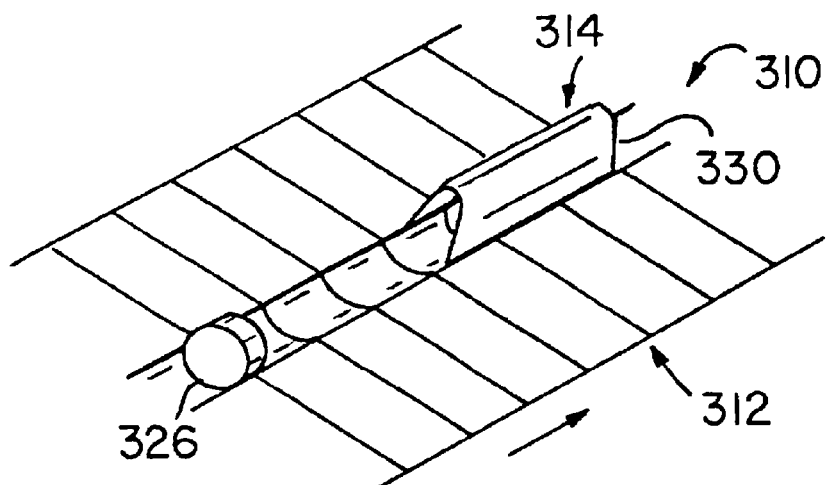
FIG. 22 is a perspective view of a portion of a poultry part processor according to a fourth exemplary embodiment, showing a conveyor and a blade assembly.
Figure 23:
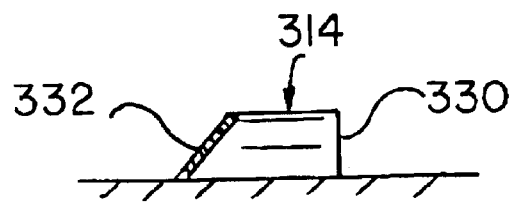
FIG. 23 is a side view of the processor portion of FIG. 22, showing the semi-tubular blade assembly.
Figure 24:
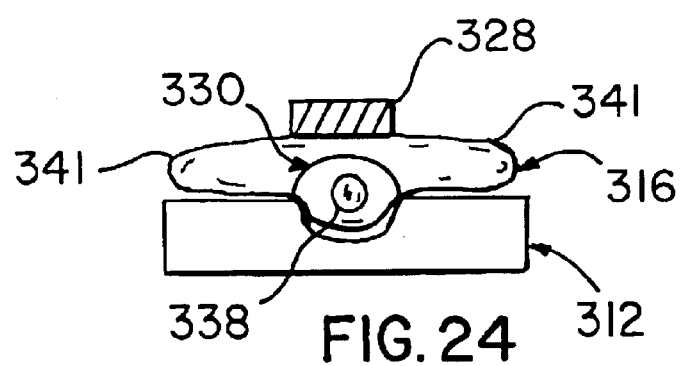
FIG. 24 is a front cross sectional view of FIG. 23, showing one of the poultry parts on the conveyor.

In a fourth exemplary embodiment shown in FIGS. 22–24, the machine 310 includes a conveyor 312 with dog members 326, a blade assembly 314, a presser foot 328, and a frame (not shown) that are similar to those of the above embodiments. However, in this embodiment the blade assembly 214 has a semi-tubular body 330 with the cutting surface 134 formed on an angled leading edge of the body.

As best shown in FIG. 24, the channel 324 and the semi-tubular blade body cooperate to form a tube that the thigh bone and some of the surrounding thigh meat (i.e., the chicken sparerib) can fit through. Also, the cutting surface 332 is positioned on the body 330 to cut away the remainder of the thigh meat (the boneless patty) from the chicken thigh 316. In this way, the blade assembly 314 cuts the chicken thigh 316 above the bone 338 and below the thigh sides 341 (including subjacent only a part of the side portions) to produce the desired parts. Accordingly, the ramps of the previous embodiments are not needed.

As mentioned above, the present invention may be embodied in methods of processing animal parts. The methods may be used for processing any animal parts having a longitudinal bone and meat surrounding the bone. For example, chicken thighs may be processed by the methods.

Generally described, the methods include the steps of providing a blade assembly and a conveyor, positioning the chicken thighs on the conveyor, conveying the chicken thighs into engagement with the blade assembly, and cutting the chicken thighs above the bone and below the side portions to separate the thigh into a first portion, the boneless meat patty, and a second portion, the chicken sparerib. The methods may be implemented using the machines of the exemplary embodiments described herein or using other equipment for processing animal parts.

Figure 25:
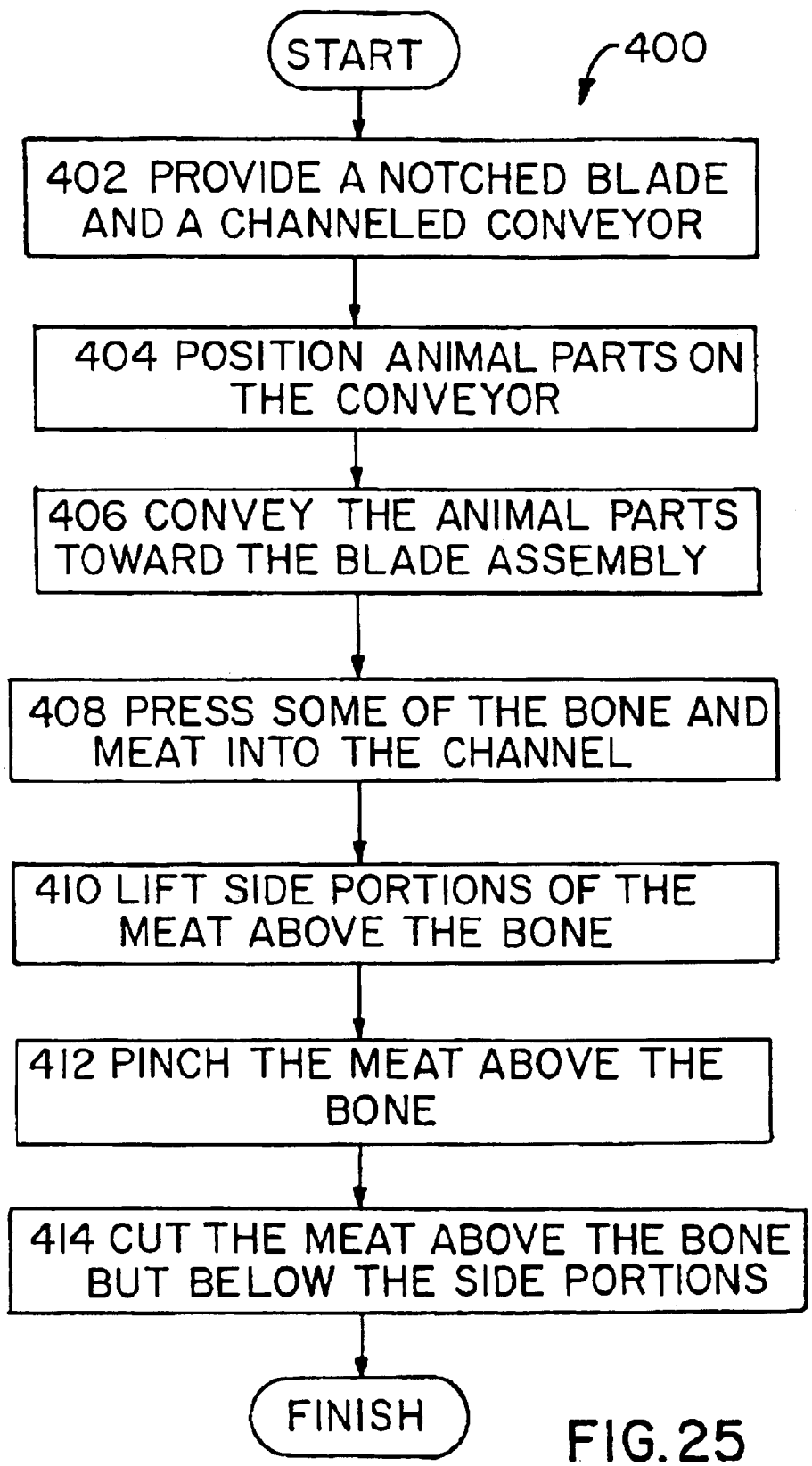
FIG. 25 is a flow diagram of an exemplary method of processing poultry according to the present invention.

Referring now to FIG. 25, there is described an exemplary method 400 of processing poultry. The method 400 includes at 402 providing a blade assembly and a conveyor. For example, these components can be provided by any of the blade assemblies and/or any of the conveyors described herein. At 404, the method includes positioning the chicken thighs on the conveyor. For example, the chicken thighs may be positioned bone-down on the conveyor and/or in a single file arrangement. Then at 406, the conveyor is operated to transport the chicken thighs toward with the blade assembly for cutting. For example, the chicken thighs can be transported one-at-a-time along the conveyor.

Also, a channel may be provided in the conveyor and a presser foot or other structure may provided above the channel. Where so provided, the method may include at 408 the step of pressing at least some of the bone and at least some of the surrounding meat (the second meat portion) into the channel before the chicken thigh reaches the cutting surface of the blade assembly. The blade assembly may include a notch forming a cutting surface, and the second meat portion is pressed to below the cutting surface. Alternatively, the chicken thighs may otherwise be positioned with the first meat portion above the cutting surface, the second meat portion and the bone below the cutting surface, and the bone generally aligned with the notch.

Additionally, at 410 the method may include the step of lifting the side portions of the thigh-meat before the chicken thigh reaches the cutting surface of the blade assembly. For example, the lifting may be accomplished by the ramps of the previously described embodiments or by other structures.

Furthermore, at 412 the method may include pinching the thigh-meat above the bone before the chicken thigh is cut by the blade assembly. For example, the pinching may be accomplished by the splayed edges of the ramps of the previously described embodiments, or by other structures.

Then at step 414, the chicken thigh is cut above the bone and below the sides. For example, the chicken thigh may be cut by the notched blade body or by another blade assembly. In any event, the result is that the chicken thigh is cut into the innovative chicken sparerib and the boneless meat patty.

Accordingly, the present invention provides machines and methods for processing thighs and/or other animal parts into innovative meat products that meet the consumer's desire for a more healthy diet. In particular, the present invention provides for processing poultry into the form of traditionally accepted products such as spareribs and boneless meat patties. Furthermore, the present invention can be used to efficiently produce these healthy meat products so that they can be sold at an economical price to consumers.

It will be understood that the terms "one," "a," and "an" as used herein are not intended to mean only one but also can mean a number greater than one. Similarly, terms used in the plural form are not intended to mean only more than one but also can mean just one. Furthermore, the methods described herein can be performed in sequences other than those described and hence are not intended to be limited to the particular sequences described.

While the invention has been shown and described in preferred forms, it will be apparent to those skilled in the art that many modifications, additions, and deletions can be made therein without departing from the spirit and scope of the invention as set forth in the following claims.

What is claimed is:

1. A machine for processing animal parts having a longitudinal bone and meat surrounding at least a portion of the bone, the machine comprising:

at least one blade assembly having at least one cutting surface configured to separate a first portion of the meat from the bone while leaving a second portion of the meat surrounding the bone; and a conveyor having a channel defined therein, wherein the channel is configured to receive substantially all of the bone, but not all of the meat, and the cutting surface is disposed adjacent the conveyor, and wherein the conveyor is adapted to move the animal part into engagement with the blade assembly.

2. The machine of claim 1, wherein the blade assembly has a notch formed therein that defines the cutting surface.

3. The machine of claim 2, wherein the notch is generally V-shaped.

4. The machine of claim 1, wherein the blade assembly includes at least two ramps disposed at sides of the channel and in front of the cutting surface, wherein the ramps lift side portions of the meat conveyed thereacross before the animal part engages the cutting surface.

5. The machine of claim 4, wherein the ramps form opposing splayed edges, wherein as the ramps lift side portions of the meat conveyed thereacross the splayed edges pinch the meat above the bone.

6. The machine of claim 4, wherein the conveyor has at least one groove formed therein generally parallel to the channel and the blade assembly has at least one downwardly extending guide that is receivable in the groove.

7. The machine of claim 4, wherein the channel is configured to receive only some of the bone and the cutting surface is spaced above the conveyor.

8. The machine of claim 1, wherein the blade assembly comprises a semi-tubular-shaped body with the cutting surface defined thereon.

9. A boneless meat patty comprising the first portion of meat separated from the animal part and a spare rib-type meat product comprising the second portion of meat separated from the animal part by the machine of claim 1.

10. A machine for processing animal parts having a longitudinal bone and meat surrounding at least a portion of the bone, the machine comprising:

at least one blade assembly having at least one cutting surface configured to separate a first portion of the meat from the bone while leaving a second portion of the meat still surrounding and attached to the bone;

a conveyor adapted to move the animal part into engagement with the blade assembly; and at least one guide element for guiding the bone and a minor portion of the meat to one side of the cutting surface and for guiding a majority of the meat to an opposite side of the cutting surface, wherein as the animal part is moved past the cutting surface the animal part is separated into a boneless meat patty and a bone with some meat still attached.

11. The machine of claim 10, wherein the blade assembly comprises a notch which is generally V-shaped.

12. The machine of claim 10, wherein the at least one guide element includes at least two ramps disposed in front of the cutting surface, wherein the ramps lift side portions of the meat conveyed thereacross before the animal part engages the cutting surface.

13. The machine of claim 12, wherein the ramps form opposing splayed edges, wherein as the ramps lift side portions of the meat conveyed thereacross the splayed edges pinch the meat above the bone.

14. The machine of claim 12, wherein the conveyor has at least one groove formed therein and the blade assembly or the at least one guide element has at least one downwardly extending guide that is receivable in the groove.

15. The machine of claim 12, wherein the conveyor has a channel defined therein that is configured to receive only some of the bone and the cutting surface is spaced above the conveyor.

16. The machine of claim 10, wherein the conveyor has a channel defined therein that is configured to receive substantially all of the bone, but not meat side portions, and the cutting surface is disposed adjacent the conveyor.

17. The machine of claim 10, wherein the blade assembly comprises a semi-tubular-shaped body with the cutting surface defined thereon.

18. A boneless meat patty comprising the first portion of meat separated from the animal part and a spare rib-type meat product comprising the second portion of meat separated from the animal part by the machine of claim 10.

19. A machine for processing animal parts having a longitudinal bone and meat surrounding at least a portion of the bone, the machine comprising:

at least one blade assembly having at least one cutting surface configured to separate in a single pass a first portion of the meat from the bone while leaving a second portion of the meat surrounding the bone;

a conveyor having a channel defined therein, the channel configured to receive at least some of the bone and the surrounding meat and to position the bone and some of the surrounding meat to one side of the cutting surface, and the conveyor adapted to move the animal part into engagement with the blade assembly; and at least one guide element for positioning at least some of the meat to a second side of the cutting surface so that the animal part is separated into a boneless meat patty and a bone with some meat still attached.

20. The machine of claim 19, wherein the channel is configured to receive only some of the bone and the cutting surface is spaced above the conveyor, and the blade assembly includes at least two downwardly extending ramps disposed at sides of the channel and in front of the cutting surface, wherein the ramps lift side portions of the meat conveyed thereacross before the animal part engages the cutting surface.

21. The machine of claim 20, wherein the ramps form opposing splayed edges, wherein as the ramps lift side portions of the meat conveyed thereacross the splayed edges pinch the meat above the bone.

22. The machine of claim 20, wherein the conveyor has at least one groove formed therein generally parallel to the channel and at least one of the ramps has at least one downwardly extending guide that is receivable in the groove.

23. The machine of claim 20, wherein the conveyor further comprises a plurality of dog members disposed in and extending above the channel for urging the animal parts into engagement with the blade assembly as the conveyor moves the animal parts, wherein the dog members are configured to pass between the ramps and below the cutting surface of the blade assembly.

24. The machine of claim 19, wherein the channel is configured to receive substantially all of the bone, but not meat side portions, and the cutting surface is disposed adjacent the conveyor.

25. The machine of claim 24, wherein the blade assembly has a wedge-shaped leading edge.

26. The machine of claim 19, further comprising a presser foot disposed above the cutting surface, wherein the presser foot engages and secures the animal part in position as the animal part is conveyed into engagement with the blade assembly.

27. The machine of claim 19, wherein the blade assembly is adjustably mounted above the conveyor so that the cutting surface can be raised or lowered relative to the conveyor.

28. The machine of claim 19, further comprising a frame, wherein the blade assembly and the conveyor are mounted to the frame.

29. A boneless meat patty comprising the first portion of meat separated from the animal part and a spare rib-type meat product comprising the second portion of meat separated from the animal part by the machine of claim 19.

* * * * *